United States Patent [19]
Fujita et al.

[11] Patent Number: 6,065,025
[45] Date of Patent: May 16, 2000

[54] PARTIAL DISPLAY PRINTING, SECURE-COMMUNICATION AND MULTIPLE COPYING FUNCTIONS IN IMAGE PROCESSING APPARATUS

[75] Inventors: Takayuki Fujita, Inagi; Michihei Murayama, Tachikawa, both of Japan

[73] Assignee: Canon Kabushiki Kaisha, Tokyo, Japan

[21] Appl. No.: 08/466,521

[22] Filed: Jun. 6, 1995

Related U.S. Application Data

[62] Division of application No. 08/365,320, Dec. 28, 1994, abandoned, which is a continuation of application No. 08/209,371, Mar. 14, 1994, abandoned, which is a continuation of application No. 07/912,672, Jul. 14, 1992, abandoned, which is a continuation of application No. 07/626,249, Dec. 13, 1990, abandoned, which is a continuation of application No. 07/198,734, May 25, 1988, abandoned.

[30] Foreign Application Priority Data

May 28, 1987 [JP] Japan ................................. 62-129913

[51] Int. Cl.[7] ...................................................... G06F 3/12
[52] U.S. Cl. ........................................................... 707/520
[58] Field of Search ........................... 395/145, 115–116, 395/779–786; 358/401, 403, 404, 442; 707/500, 517–521

[56] References Cited

U.S. PATENT DOCUMENTS

| | | | |
|---|---|---|---|
| 4,054,914 | 10/1977 | Fukuoka | 358/442 |
| 4,466,065 | 8/1984 | Advani et al. | 395/874 |
| 4,495,562 | 1/1985 | Yamaji et al. | 395/675 |
| 4,511,928 | 4/1985 | Colomb | 358/468 |
| 4,532,554 | 7/1985 | Skala | 358/434 |
| 4,574,364 | 3/1986 | Tabata et al. | 345/343 |
| 4,587,633 | 5/1986 | Wang et al. | 395/200.64 |
| 4,630,198 | 12/1986 | I-Yuan | 711/118 |
| 4,630,199 | 12/1986 | Lorenzi et al. | 395/114 |
| 4,652,933 | 3/1987 | Koshiishi | 358/426 |
| 4,719,514 | 1/1988 | Kurahayashi et al. | 358/431 |
| 4,796,091 | 1/1989 | Nohtomi | 358/444 |
| 4,819,233 | 4/1989 | Delacia et al. | 395/704 |
| 4,912,670 | 3/1990 | Hattori | 395/113 |
| 4,947,370 | 8/1990 | Sugitani | 345/124 |

OTHER PUBLICATIONS

Cobb, Excel In Business, 1985, pp. 16, 306, 320.
Microsoft, Reference to Microsoft Word, 1986, pp. 64–67.

*Primary Examiner*—Anton Fetting
*Attorney, Agent, or Firm*—Fitzpatrick, Cella, Harper & Scinto

[57] ABSTRACT

There is provided an image processing apparatus having communicating and recording functions. This apparatus comprises: a communication control unit to communicate an image; a memory to store image information received from the communication control unit; a CRT display to display the image information stored; a designating device to designate a desired area in the image displayed on the CRT display; a printer to print only the area designated by the designating device from the image information stored; and, preferably a second designating device to designate the number of copies of the image information which are to be printed by the printer. With this apparatus, the necessary area in the received image information can be printed alone, in just the necessary number of copies. Thus losses of the paper and printing time can be prevented.

18 Claims, 7 Drawing Sheets

PARTIAL DISPLAY PRINTING, SECURE-COMMUNICATION AND MULTIPLE COPYING FUNCTIONS IN IMAGE PROCESSING APPARATUS

This application is a division of application Ser. No. 08/365,320 filed Dec. 28, 1994, which was a continuation of application Ser. No. 08/209.371 filed Mar. 14, 1994, which was a continuation of application Ser. No. 07/912,672 filed Jul. 14, 1992, which was a continuation of application Ser. No. 07/626,249 filed Dec. 13, 1990, which was a continuation of application Ser. No. 07/198,734 filed May 25, 1988, all now abandoned.

BACKGROUND OF THE INVENTION

1. Field of the Invention

The present invention relates to an image processing apparatus having a communicating function and a recording function.

2. Related Background Art

Recently, facsimile apparatuses having memory devices of a large capacity have been widely used. In such a conventional facsimile apparatus having the function to temporarily store the received image, the storing function merely plays a role of a buffer of a print spooler. More specifically, the printing speed of printing image information is generally slower than the transmission speed. Therefore, the received image information is once stored into a high-speed memory device, while the image information stored in the memory device is sequentially printed by a printer. With this method, even when the printing speed is slow, the transmission speed does not deteriorate.

However, the conventional received image recording apparatus representative of the facsimile apparatus as mentioned above has the following drawbacks.

(1) Since all of the received image information is unconditionally output to the printer, the image information which does not need to be recorded on the paper is printed, so that there is such drawback that paper and time are wasted. Further, since unnecessary information is also included in the image information, there is the drawback that when such unnecessary information is stored in a file and this file is left (i.e., not used), the space is occupied to no immediate benefit by this unnecessary file.

(2) Since all of the received image information is unconditionally output to the printer, there is the drawback that confidential information can also be read by a third person.

(3) Since the received image information is successively output to the printer, it is difficult for a receiving person quickly to find out the information intended for him and there is also a fear of loss of his information. Further, only image information corresponding to one sheet of recording paper is output to the printer at a time. Accordingly, there is an inconvenience that when the printed recording paper is distributed to several persons, it must be copied by a copying machine.

SUMMARY OF THE INVENTION

The present invention is made in consideration of the foregoing problems and intends to eliminate the foregoing drawbacks.

Another object of the invention is to provide an image processing apparatus which can selectively record a desired area of the received image information.

Still another object of the invention is to provide an image processing apparatus in which image information stored in memory means is recorded on the basis of recording control information which is received from communicating means when ID information is further input.

Still another object of the invention is to provide an image processing apparatus which can designate the number of copies to be made of the received image information.

Still another object of the invention is to provide an image information processing apparatus which integratedly manages the related information on the basis of the ID codes which are added to the received image information.

DETAILED DESCRIPTION OF THE PREFERRED EMBODIMENT

An embodiment of the present invention will now be described in detail hereinbelow with reference to the drawings.

Figure 1:
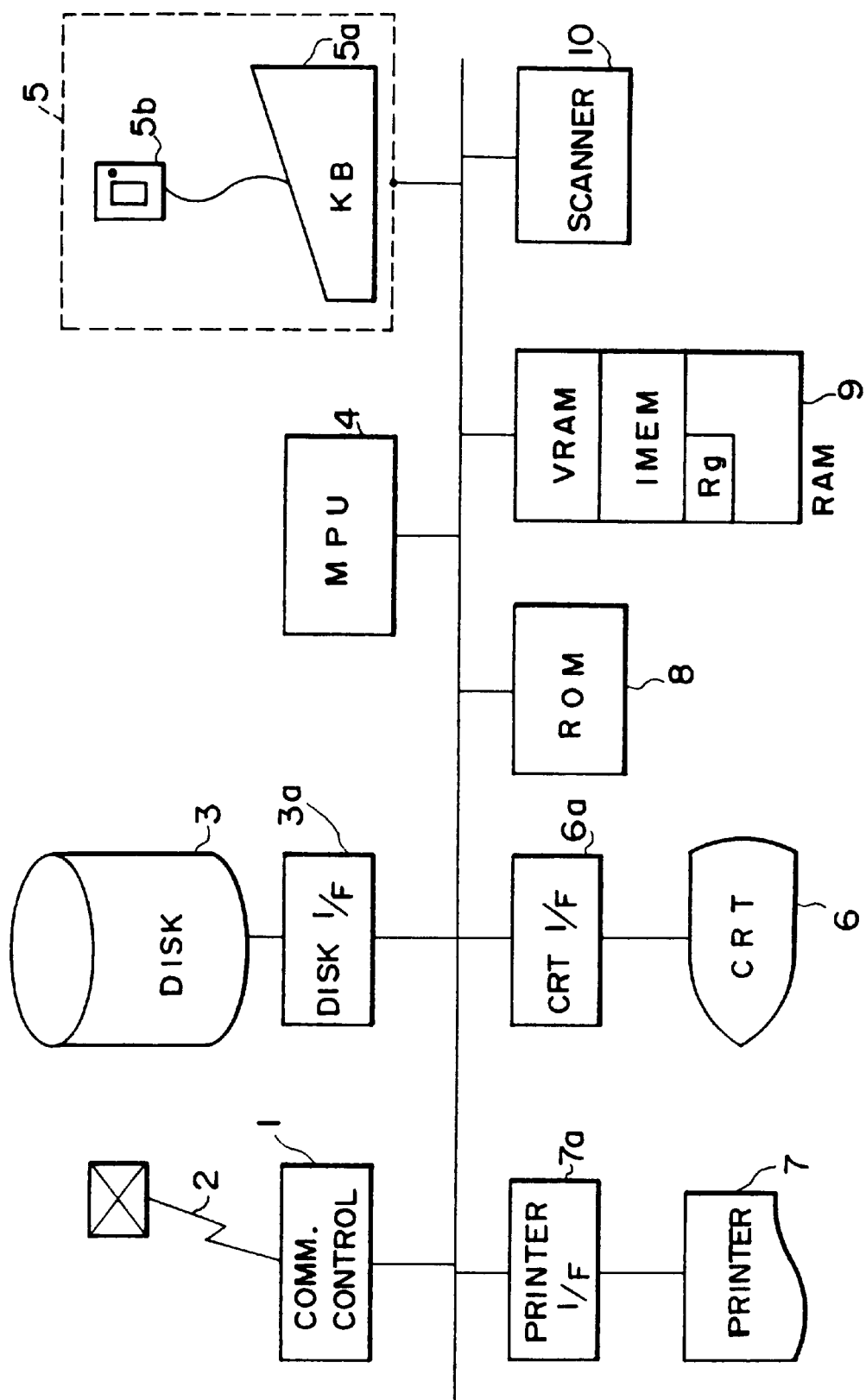
FIG. 1 is an arrangement diagram of a received image recording system in an embodiment of the present invention.

FIG. 1 is an arrangement diagram in an embodiment in the case where the invention is applied to what is called a personal computer system.

(Whole arrangement)

In the diagram, reference numeral 1 denotes a communication control unit for controlling data communication through a public telephone line. The communication control unit 1 is connected to the public telephone line by a signal cable 2. The received image information is stored into a memory device 3 consisting of a disk in this embodiment. A disk interface 3a controls the disk 3. A plurality of image information are managed as files on the disk 3 on the basis of an ordinary file managing procedure used by the computer. That is the image information received by the communication control unit 1 is stored into the data storage area on the disk 3. The identification name (ID code) of the image information and the storage physical addresses on the disk 3 are written into directories, respectively.

A data processing apparatus 4 controls the reception data, the operation of the system, and the like and consists of, e.g., a microprocessor (MPU) or the like. An operation panel 5 is used to instruct the system and comprises a keyboard 5a, a pointing device 5b to designate the shift of a cursor 50 in FIG. 2, and the like. Reference numeral 6 denotes a display device such as a CRT to display various kinds of operation instructing information or the like. A CRT interface 6a controls the display device 6. As the display device 6, it is also possible to use a display device of the touch panel type to input a desired designating information by touching with a finger the display position of each of various kinds of display information on the menu screen displayed on the CRT or by touching the position near the display position with a finger. A printer 7 prints the image information. To print the image information as a dot image, a laser beam printer or the like is desirable as the printer 7. Programs, which will be explained hereinlater, are stored in a ROM 8. On the other hand, a VRAM area for the display device 6 and an image memory (IMEM) area for the printer 7 are provided in an RAM 9. The RAM 9 is also used to store the intermediate data.

A scanner 10 functions as a well-known image reading section and includes a CCD line sensor, its control section, and the like.

(Function)

Figure 2:
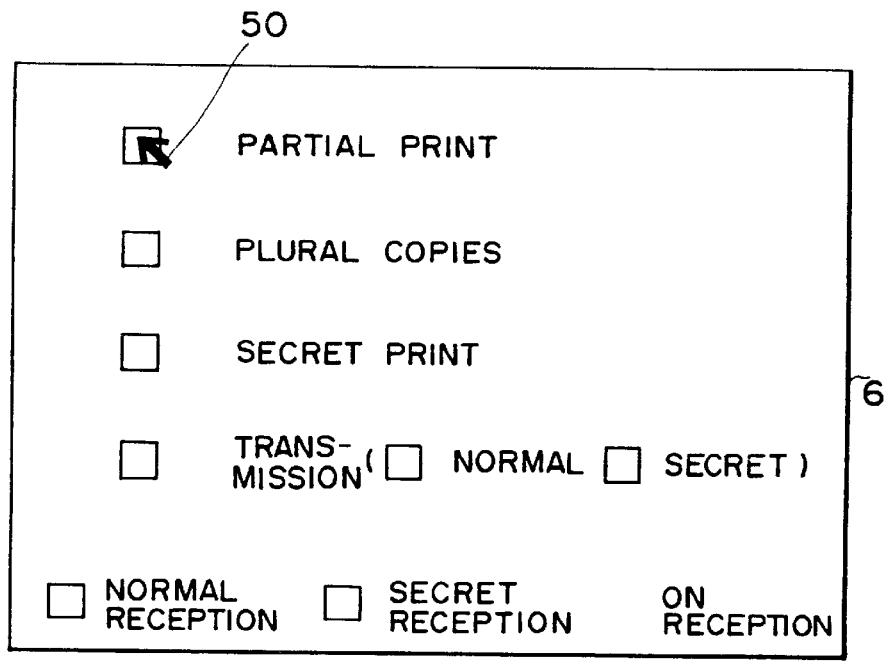
FIG. 2 is a diagram showing an examples of a menu display to select the functions in the system of the embodiment of FIG. 1.

The system of the embodiment has the following three main functions: the "PARTIAL PRINT" function to partially print the received image information; the "PLURAL COPIES" function to designate the number of copies to be made; and the "SECRET RECEPTION PRINT" functions in which confidential image is not immediately printed but stored into the memory device (on the disk 3) and printing is later permitted as necessary. FIG. 2 shows a menu screen which is displayed on the display device 6 in FIG. 1 for selecting any of those functions (including the "PARTIAL PRINT", "PLURAL COPIES", "SECRET RECEPTION PRINT", and "TRANSMISSION" functions).

In the "SECRET RECEPTION" mode shown in the lower portion in FIG. 2, the "SECRET RECEPTION" function is executed. On the other hand, the "NORMAL RECEPTION" mode is the conventional receiving mode and provides the function to immediately store the image information after the reception and to print it. When the image information is received, it is at once stored and printed. When "ON RECEPTION" is displayed, if the system in FIG. 1 is activated so as to be used as a facsimile apparatus, the receiving mode (for a program in FIG. 4 or 7) is automatically set. While the image is being actually received from the transmitting side, "ON RECEPTION" is displayed to thereby inform the operator.

Figure 3:
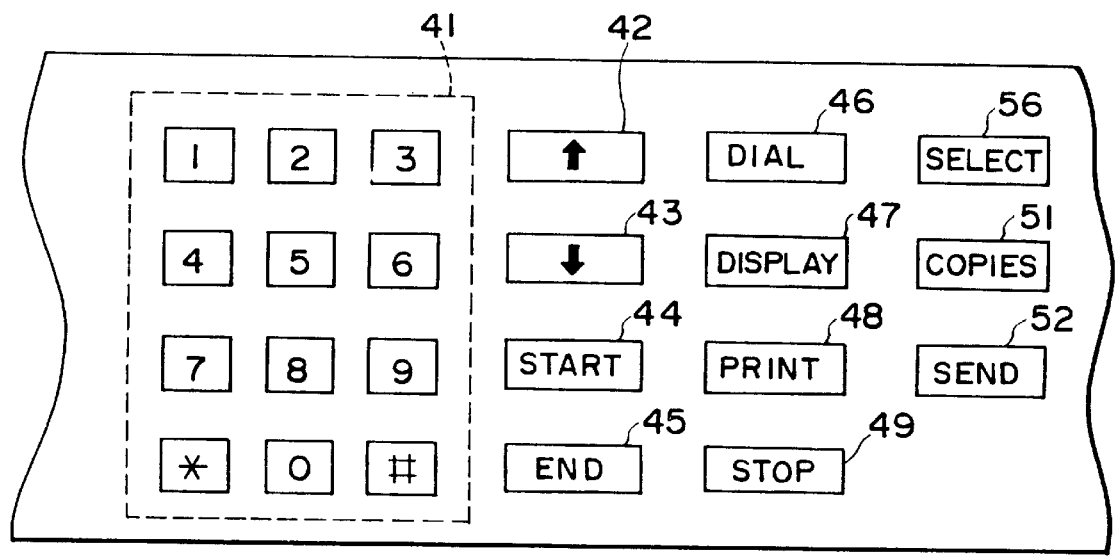
FIG. 3 is a diagram showing an example of arrangement of keys of a keyboard on an operation panel.

FIG. 3 shows a diagram of the section regarding the embodiment of the keyboard 5a which is used in the embodiment. The keyboard may be formed by a virtual keyboard on the display device 6. In this case, data is input by a touch panel system. It is also possible to substitute the virtual keyboard for a part or all of the keyboard. The operation and functions of the keyboard 5a will now be explained hereinafter. As mentioned above, the following description can be also applied to the case of designating by the touch panel system. In the diagram, reference numeral 41 denotes a portion of numeral keys to input a dial number, a file ID code, and the like; 42 to 45 indicate keys to designate areas to be printed for performing the partial print on the display screen; and 46 to 48 represent keys to designate the operations and functions. After the "TRANSMISSION" function is selected, if the dial number is input and the "DIAL" key 46 is depressed, the image information is transmitted to the reception side dialed in a manner similar to the ordinary facsimile apparatus. As mentioned above, these operations can be also all designated on the display device 6 by the touch panel system. On the other hand, as an area to be printed, a desired area of the received image which is displayed on the display device can be also designated by directly touching the position of the desired area on the CRT by a finger or the like. Reference numeral 42 denotes the key to designate so as to scroll the image upward on the CRT 6; 43 indicates the key to designate so as to scroll the image downward on the CRT 6; and 44 and 45 denote the keys to designate an area to be partially printed.

The image communication control procedure of the communication control unit 1 in the embodiment is fundamentally based on the well-known GIII control procedure for facsimile apparatuses. Further, in the user opening section in the GIII control procedure, the ID code of the communication image, information to indicate whether the image to be transmitted should be made secret or not, and the like are transmitted from the transmission side to the reception side.

The respective functions will be explained hereinbelow.

(Image reception)

Figure 4:
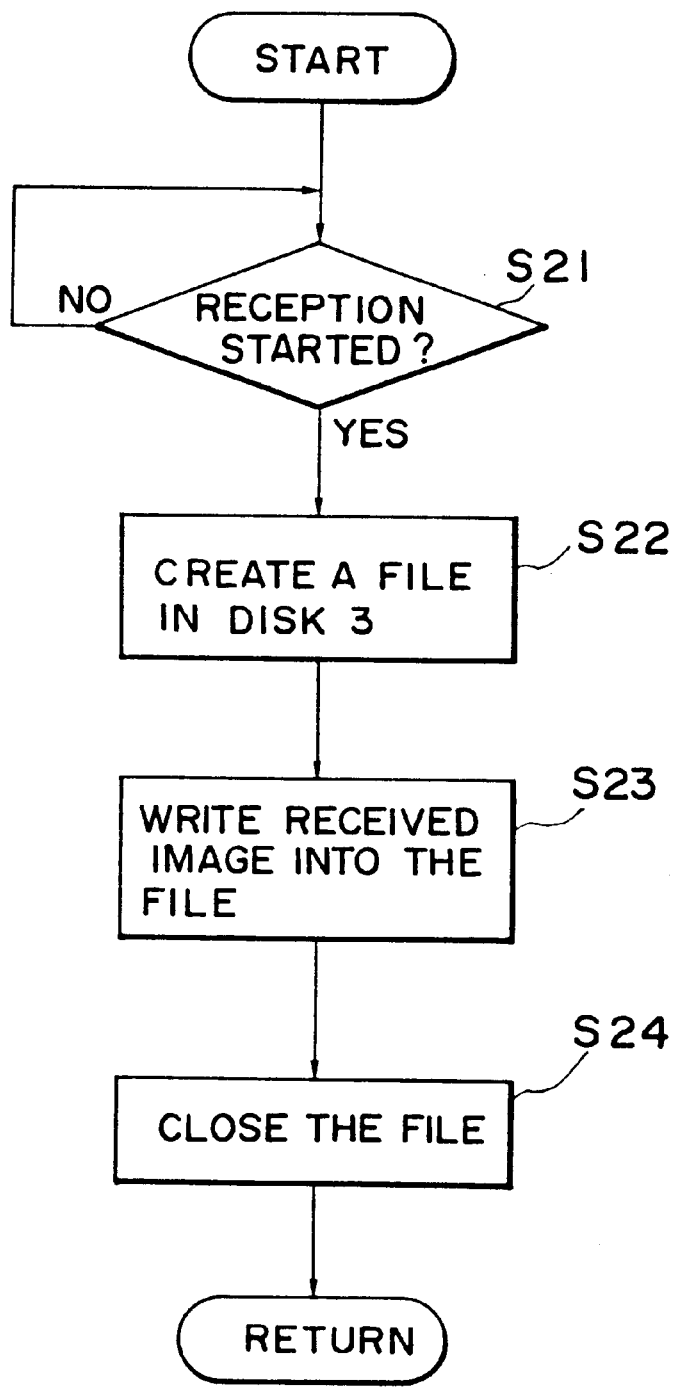
FIG. 4 is a flowchart for a program showing a control procedure in the "normal reception" mode in the embodiment of FIG. 1.

First, the operations of the communication control unit 1, disk 3, data processing unit 4, and printer 7 when receiving the image information in the case where the system with the foregoing constitution is used as a facsimile apparatus, will be explained. FIG. 4 shows a flowchart for these operations (in the "NORMAL RECEPTION" mode).

In step S21, a check is made to see if the reception of the image information has been started or not. The discriminating step S21 for reception of the image information is actually performed by the interruption control so as to be executed in parallel with the other tasks. That is, while the apparatus is waiting for the interruption by the reception of the image information in step S21, for example, the menu in FIG. 2 can be selected. For instance, the image information can be received while the "PARTIAL PRINT" function is selected.

When the reception of the image information is started in step S21, the ID code of the reception information is taken out by, e.g., phase B in the GIII control procedure. In step S22, a file is created on the disk 3 by using the ID code as a file name. It is convenient to use the name of person who will receive the transmitted image information, his code, or the like as the ID code. Therefore, since there will be case where an image is repetitively sent by the same ID code, it is desirable to form unique file names by further adding serial numbers, reception times, or the like to the ID codes transmitted. On the other hand, in order to enable the system to be also used as an ordinary personal computer system, it is desirable that file attributes are given as image files, thereby making it possible to distinguish the image files from the program file or other disk files which are stored on the same disk 3.

In step S23, all of the received images are written into the file. This file is closed in step S24. In this manner, one receiving process is finished. Then, the processing routine is returned to step S21 to wait for the next reception. If another image information is received, the above-mentioned routine is executed and the image file is formed in the disk 3.

(Partial print)

Figure 5:
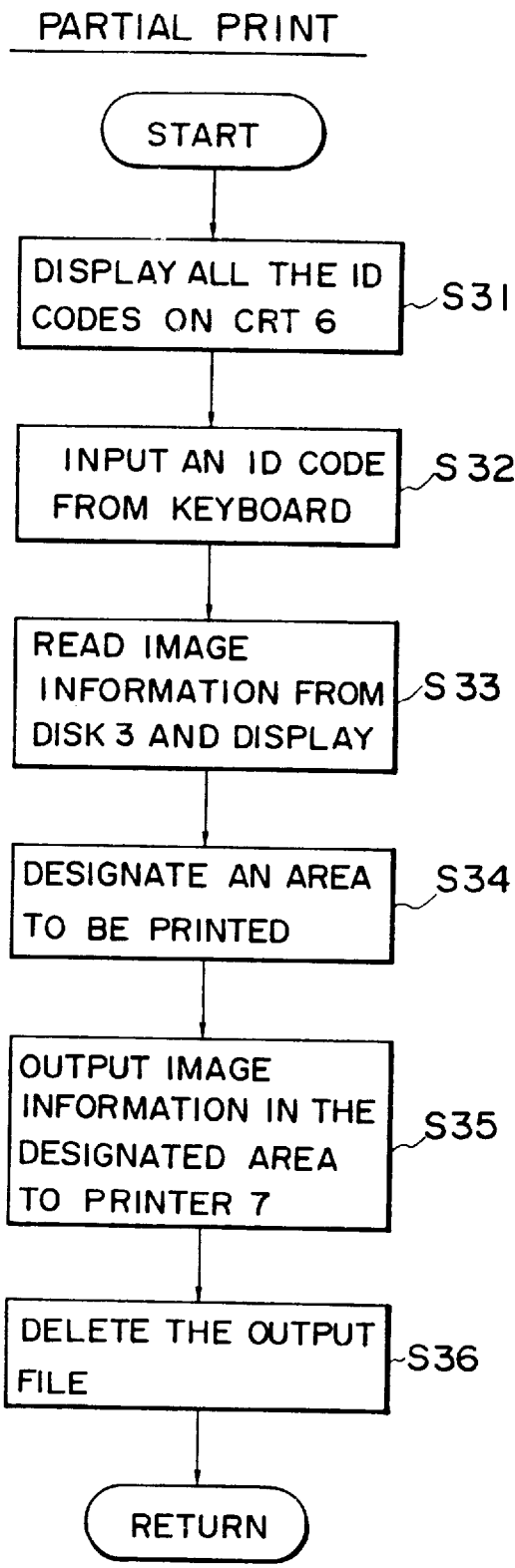
FIG. 5 is a flowchart for a program showing a control procedure of the "partial print" function in the embodiment of FIG. 1.

The operations of the data processing unit 4, keyboard 5a, display device 6, and printer 7 in the partial printing mode will now be described with reference to the image information on the disk 3. FIG. 5 shows a flowchart for these operations. The program shown in FIG. 5 is accessed when the "SELECT" key 56 is depressed by shifting the cursor to "PARTIAL PRINT" shown in FIG. 2.

In the diagram, when the "DISPLAY" key 47 is depressed, the file ID codes of all of the image information files stored on the disk 3 are displayed as a table on the CRT 6 in step S31. At this time, the MPU 4 searches the contents of the directories on the disk 3 and sequentially displays the image information having the attributes of the image files. In addition, it will be convenient if the reception times of the image files are also together displayed.

In step S32, the operator inputs the file ID code of the image file to be printed or displayed by operating the keyboard 5a. In this case, for convenience of explanation, if the ID codes are transmitted as a numeral train from the transmission side, the operator on the reception side can also directly use the button 41 for communication dial. In step S33, the MPU 4 reads out the image information of the file having this ID code from the disk 3 and developes in the VRZM in the RAM 9 and displays it on the CRT 6. At the same time of the development in the VRAM, the image information is also developed as a printing image in the IMEM area in the RAM 9. In step S34, the operator designates a desired area to be printed by seeing the image displayed.

The operation to designate the area to be printed in step S34 will now be explained. In FIG. 2, reference numeral 42 denotes the key to shift the cursor upward. If the key 42 is further pressed when the cursor is located at the top end on the display, the image information is scrolled upward on the CRT 6. Reference numeral 43 denotes the key to shift the cursor downward. If the key 43 is further pressed when the cursor is located at the bottom end on the display, the display screen is scrolled downward. These operations can be also designated by the pointing device 5b. The area to be partially printed is designated by using the keys 44 and 45. That is, in this embodiment, the area to be printed is designated as a rectangular area. When the "START" key 44 is pressed, the position of the cursor on the display screen at that time is set to the left top end in the printing area. When the "END" key 45 is pressed, the position of the cursor at this time is set to the right bottom end in the printing area. In the case of printing a special area in the display image, a desired image is first displayed by the "DISPLAY" key 47 and the cursor shift keys 42 and 43 are further pressed and the left top end and right bottom end in the printing area to be designated are designated by the "START" key 44 and "END" key 45. In this manner, the printing area is designated. The information regarding the printing area is given as address information to the MPU 4.

After the area to be printed is designated, when the "PRINT" key 48 is pressed, the designated area is output to the printer 7 in step S35. First, the MPU 4 sets all of the image information in the IMEM area included in the areas other than the printing area designated into "0". This process can be easily realized by, for example, the AND function of the MPU 4 or the like. The image whose information out of the designated printing area have all been cleared to "0" as mentioned above is output to a printer interface 7a and printed by the printer 7.

In step S36, the file which was output is deleted from the disk 3, thereby enabling the memory area to be used for the next received image information.

In this manner, the printing operation of one file is finished and the processing routine is returned to "START" for reception of the next printing instruction.

In this manner, a special image file is selected from a plurality of image information files received by the ordinary transmission control procedure of a facsimile apparatus, a desired area which is truly necessary is designated in the selected one image file, and only this area can be printed.

The area to be partially printed can be also designated on a page unit basis of the image.

Although the designated area has been printed in this embodiment, it is also possible to mask only the designated area and to print the other areas. In this case, it is sufficient that the image information to be masked in the designated area is all set to "0" in the IMEM area.

(Printing of Plural Copies)

Figure 6:
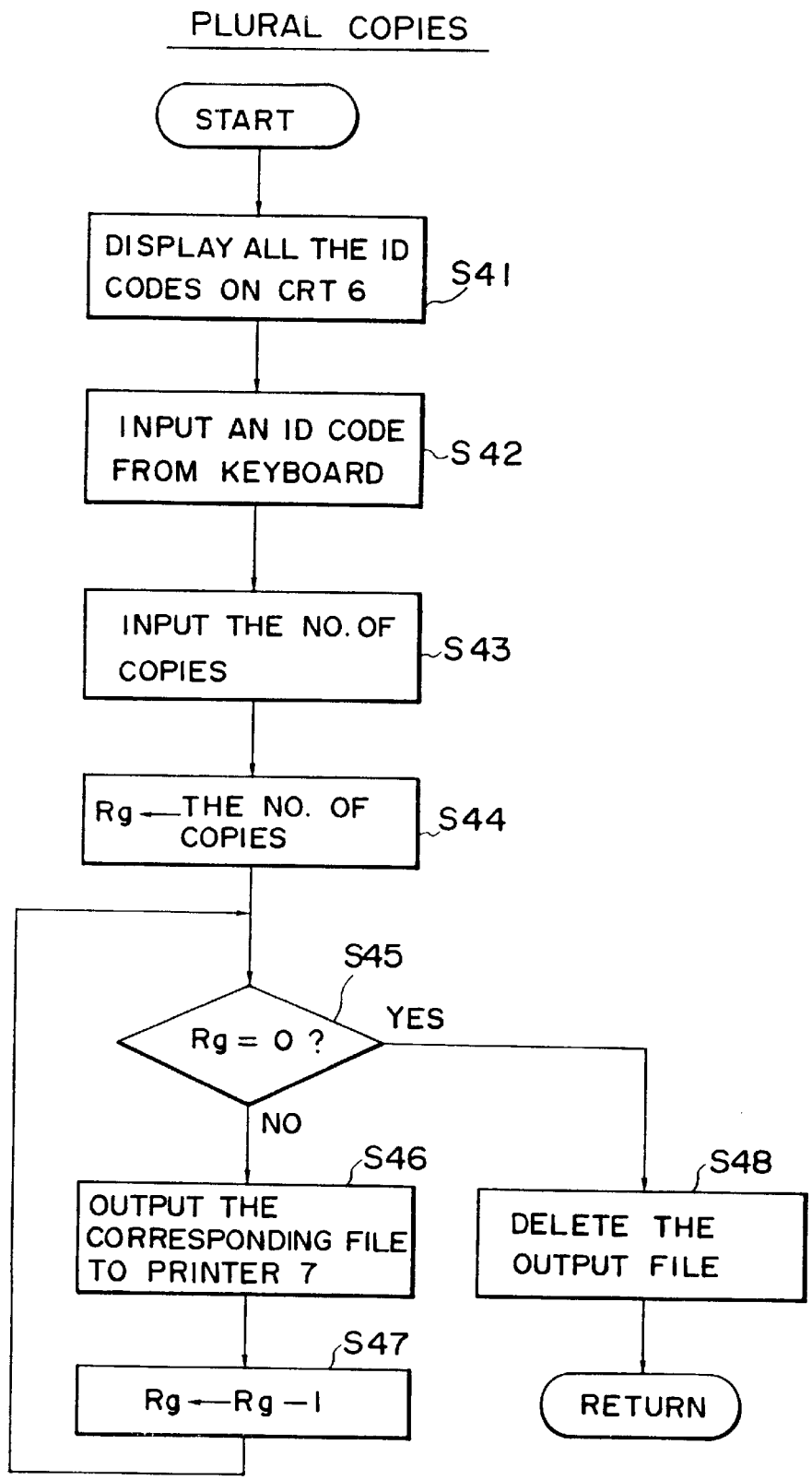
FIG. 6 is a flowchart for a program showing a control procedure of the "plural copies" function in the embodiment of FIG. 1.

The function to print a plurality of copies of one of the image files stored on the disk 3 will now be described with reference to a flowchart shown in FIG. 6. The program shown in FIG. 6 is accessed when the cursor is set to "PLURAL COPIES" shown in FIG. 2 and the "SELECT" key 56 is depressed.

The processes in steps S41 and S42 are the same as those in the program of FIG. 5.

The operator inputs the number of necessary copies in step S43 while seeing the displayed content. That is, "COPIES" key 51 is actuated subsequent to the numeral key indicative of the number of copies.

After the "PRINT" key 48 is depressed, the number of copies designated is stored into a register $R_g$ in the RAM 9 in step S43.

Until the content of the register $R_g$ is set to 0, the output and recording of the image file designated in step S42 are repeated in the processing roop in steps S45 to S47.

After completion of the printing of the number of copies designated, the processing routine advances from step S45 to step S48 and the printed file is deleted from the disk 3, thereby enabling the memory area to be used for the next received image. In this manner, the processes for one file are finished and the processing routine is returned to the main routine to select the menu for reception of the next printing command.

As a modification, in step S42 in FIG. 6, after the file ID code input by operation of the key section 41, the "DISPLAY" key 47 is depressed, thereby making it possible to instruct so as to display the designated file on the CRT 6. It is also possible to constitute embodiment in a manner such that after the designated file is displayed as explained above, when "PRINT COPIES" is input and the "PRINT" key 48 is depressed, only the page displayed on the CRT 6 is printed in only the number of copies designated. That is, the image of one page displayed is copied as a plurality of copies instead of all of the pages of the received being copied. Or, it is also possible to constitute the embodiment such that after a desired area to be partially printed shown in FIG. 5 is designated, by designating the number of copies of this printing area, the desired area is printed in only the number of necessary copies.

On the other hand, it is also possible to constitute the embodiment such that when the number of copies is set to "0", nothing is printed, the file is deleted and the processes are finished. This constitution will be convenient since the printing labor and cost can be saved in case of the information which does not need to be printed because it is sufficient merely for the operator to see the content displayed on the CRT 6.

(Reception/Print of Secret Image)

The operation when the "SECRET RECEPTION PRINT" function in FIG. 2 is selected will now be explained with reference to FIGS. 7 and 8.

Figure 7:
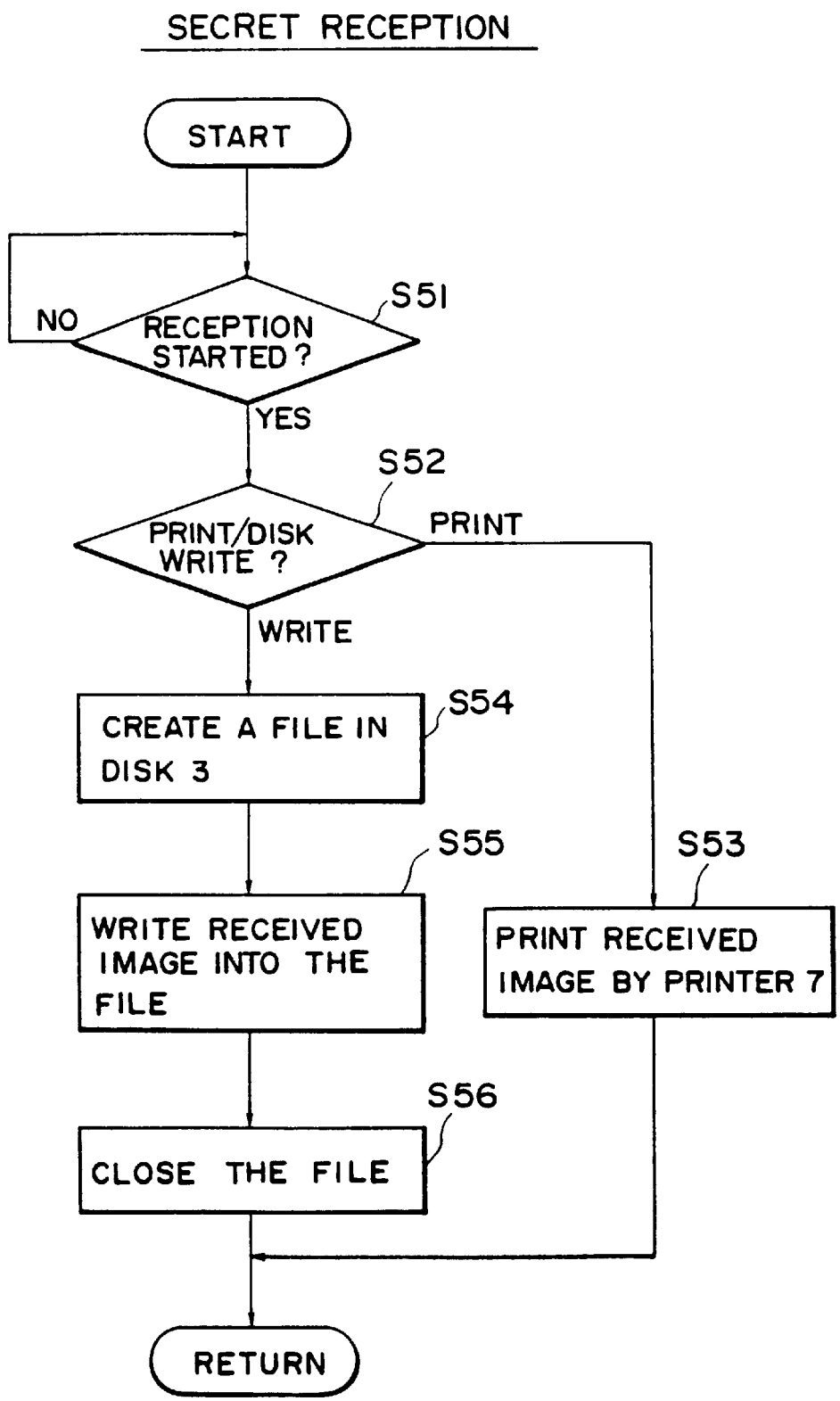
FIG. 7 is a flowchart for a program showing a control procedure in the "secret reception" mode in the embodiment of FIG. 1.
Figure 8:
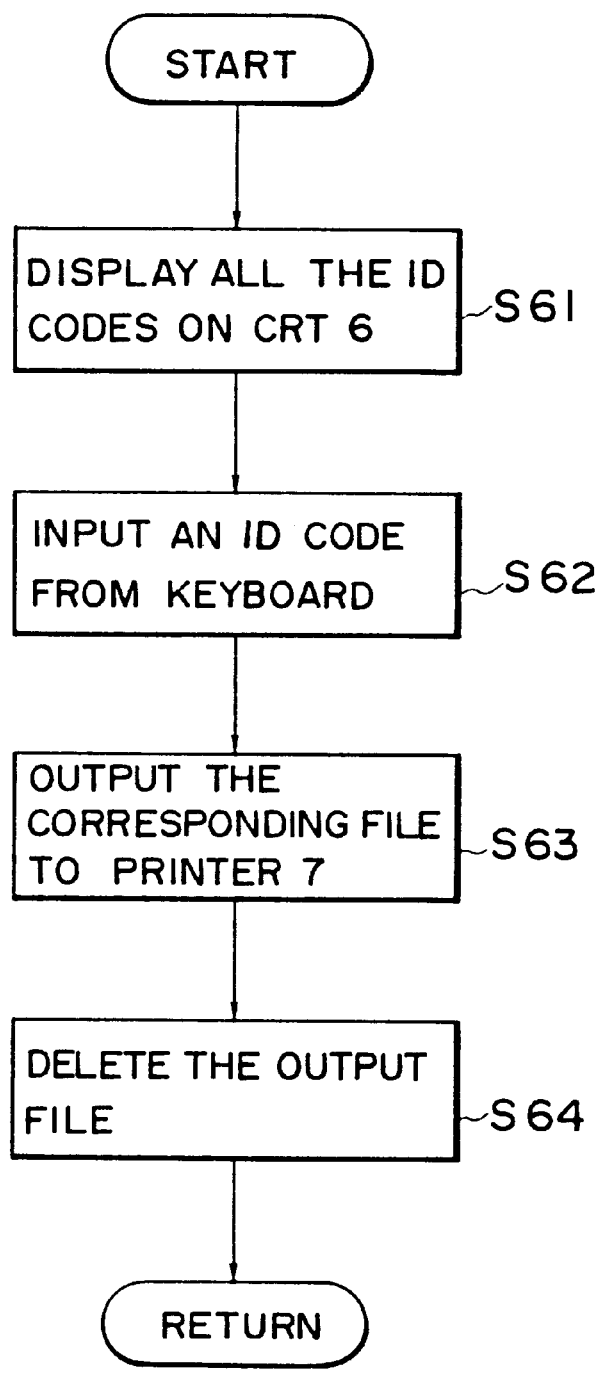
FIG. 8 is a flowchart for a program showing a control procedure of the "secret print" function in the embodiment of FIG. 1.

When the "SECRET RECEPTION" menu in FIG. 2 is selected, the program shown in FIG. 7 is accessed from the main routine. Then, in step S51, a check is made to see if the reception has been started or not. As mentioned in step S21, while the apparatus is waiting for the reception in step S51, the other tasks can be activated. When the reception is started, the information to designate whether the received image information is printed by the printer 7 or written into the image memory device 3 is taken out in accordance with the procedure of, e.g., phase B of GIII. This designation is decided in step S52. If this information designates the printing mode, the received image is printed by the printer 7 in step S53 in a manner similar to the ordinary facsimile apparatus and the processing routine is finished. In step S53, it is also possible to create the file on the disk 3 and the processing routine is finished in a manner similar to FIG. 4.

On the other hand, if the writing operation onto the disk 3 is designated in step S52, step S54 follows and the ID code name of the received image information is further taken out in accordance with the communicating procedure and the file is created on the disk 3 by using the code name as a file name. In step S55, all of the received images are written onto the file. The file is closed in step S56.

The receiving processes of one file are finished in this manner and the processing routine is returned to the main routine for the next reception. Further, in step S51, the secret image receiving mode is set.

The processes when the "SECRET PRINT" menu in FIG. 2 is selected will now be explained with reference to a flowchart of FIG. 8. After the "DISPLAY" key 47 is depressed, the file ID codes of the image information files stored on the disk 3 are displayed as a list on the CRT 6. At this time, it is convenient to add the corresponding ID Mark to the image received in the "SECRET RECEPTION" mode and to display it. In step S62, the operator inputs the file ID code of the image file to be printed by the keyboard 5a. In step S63, the MPU 4 reads out the file corresponding to the ID code input from the disk 3 and develops in the IMEM in the RAM 9 and prints the image information by the printer 7. After completion of the printing, the printed file which is no layer needed is deleted from the disk 3 in step S64, thereby enabling the memory area to be used for the next image reception.

The printing processes of one file are finished in this manner and the processing routine is returned to "START" for reception of the next printing command.

In this way, during the communicating procedure, there is provided the information section to designate whether the received image is immediately printed or not. On the reception side, the printing is inhibited in accordance with the information or it is printed just after the reception of the information. Thus, the secrecy of the significant confidential image is held by the operation control on the transmission side who recognizes the significance of the transmitting image. Further, by also providing the step of transmitting a pass word in the communicating procedure, in step S62 in FIG. 8, in addition to the file ID code which is input by the operator on the reception side, a pass word is also input and if the printing is permitted only when the pass word coincides, the secrecy is further enhanced. Moreover, as shown in FIG. 6, the printing mode of a plurality of copies can be also designated.

In the case of transmitting image information, if "TRANSMISSION" in FIG. 2 is selected, the scanner 10 is energized and the original is read. By pressing the "TRANSMISSION" key 52 in FIG. 3, the communication control unit 1 outputs the image data to the telephone line.

As described above, according to the present invention, memory means is coupled with image communicating means and the image stored in the memory means is enabled to be partially printed, so that only the necessary area in the image is masked and printed and the loss of paper and of printing time can be eliminated. In addition, there is also an advantage that the information can be efficiently pigeonholed.

We claim:

1. An information processing apparatus comprising:
communication means for communicating information with another apparatus via a communication line;
reception means, connected to said communication means, for receiving image information and identification information from the another apparatus;
memory means, connected to said reception means, for storing, as a file, the image information every time the image information is received, such that a plurality of files of the image information is stored, the received identification information being used as a file name, wherein the plurality of files of the image information are distinguished from each other by the received image information and another information added thereto;
instruction means for instructing a display means to display respective titles of the plurality of files of the image information stored in said memory means; and
control means for sending one of the files of the stored image information corresponding to a desired one of the displayed titles to a print means and for controlling said memory means to use an area in which the one of the files of the image information was stored, to store a new file of image information to be subsequently received by said communication means, after the one of the files of the image information is printed by the print means.

2. An apparatus according to claim 1, further comprising the display means for displaying the titles of the image information.

3. An apparatus according to claim 1, further comprising means for moving a cursor on the display means to select one of the displayed titles.

4. An apparatus according to claim 3, further comprising means for controlling the display means to display one piece of the image information corresponding to the selected one title.

5. An information processing apparatus according to claim 1, further comprising menu display control means for controlling the display means to display a print menu of instructions for printing the one of the files of the image information.

6. An information processing apparatus according to claim 5, wherein the print menu includes an icon for partial print and an icon for printing a plurality of copies.

7. An information processing apparatus according to claim 6, further comprising selection means for selecting two opposite edges of an area to be printed when the icon for partial print is selected.

8. An apparatus according to claim 1, further comprising manual input means for manually inputting a desired one piece of the identification information.

9. An apparatus according to claim 8, wherein the another information added to the identification information comprises time information representing a time of reception of the image information.

10. An information processing method comprising the steps of:
receiving image information and identification information;
storing, as a file, the image information in a memory every time the image information is received in said receiving step, such that a plurality of files of the image information is stored in the memory, the received identification information being used as a file name, wherein the plurality of files of the image information are distinguished from each other by the received identification information and another information added thereto;

instructing a display means to display respective titles of the plurality of files of the image information stored in the memory in said storing step; and sending one of the files of the stored image information corresponding to a desired one of the displayed titles to a print means and controlling the memory to use an area in which the one of the files of the image information was stored, to store a new file of image information to be subsequently received in said receiving step after the one of the files of the image information is printed by the print means.

11. A method according to claim 10, wherein said storing step stores one piece of the image information in a new memory area each time the image information is received in said receiving step.

12. A method according to claim 10, wherein said storing step stores the image information in an external memory device.

13. A method according to claim 12, wherein said storing step stores the image information in a disc.

14. An information processing method according to claim 10, further comprising the step of controlling the display means to display a print menu for instruction for printing the one of the files of the image information.

15. An information processing method according to claim 14, wherein the print menu includes an icon for partial print and an icon for printing a plurality of copies.

16. An information processing method according to claim 15, further comprising the step of selecting two opposite edges of an area to be printed when the icon for partial print is selected.

17. An apparatus according to claim 10, further comprising the step of inputting a desired one piece of the identification information with a manual input means.

18. An apparatus according to claim 17, further comprising the step of adding time information to the identification information as the another information, the time information representing a time of reception of the image information.

* * * * *

UNITED STATES PATENT AND TRADEMARK OFFICE
CERTIFICATE OF CORRECTION

PATENT NO. : 6,065,025
DATED : May 16, 2000
INVENTOR(S) :
    TAKAYUKI FUJITA ET AL.

It is certified that error appears in the above-identified patent and that said Letters Patent is hereby corrected as shown below:

ON THE TITLE PAGE [57] ABSTRACT:

Line 14, "Thus" should read --Thus,--.

COLUMN 1:

Line 8, "08/209.371" should read --8/209,371--;
    Line 39, "such" should be deleted;
    Line 43, "used)," should read --erased),--;
    Line 51, "him" should read --them--; and
    Line 52, "his" should read --their--.

COLUMN 2:

Line 57, "is" should read --is,--.

COLUMN 4:

Line 3, "by" should read --with--; and
    Line 40, "case" should read --a case--.

COLUMN 6:

Line 22, "roop" should read --loop--.

COLUMN 7:

Line 47, "pass word" should read --password--;
    Line 49, "pass word" should read --password--; and
    Line 50, "pass word" should read --password--.

UNITED STATES PATENT AND TRADEMARK OFFICE
CERTIFICATE OF CORRECTION

PATENT NO. : 6,065,025

DATED : May 16, 2000

INVENTOR(S) :

TAKAYUKI FUJITA ET AL.

It is certified that error appears in the above-identified patent and that said Letters Patent is hereby corrected as shown below:

COLUMN 9:

Line 16, "Λ" should read --A--.

COLUMN 10:

Line 7, "Λn" should read --An--; and
    Line 17, "Λn" should read --An--.

Signed and Sealed this

Third Day of April, 2001

*Attest:*

NICHOLAS P. GODICI

*Attesting Officer*     *Acting Director of the United States Patent and Trademark Office*